(12) United States Patent
Doi et al.

(10) Patent No.: US 8,874,280 B2
(45) Date of Patent: Oct. 28, 2014

(54) INFORMATION PROCESSING SYSTEM, METHOD FOR CHECKING VEHICLE, AND PROGRAM FOR CHECKING VEHICLE

(75) Inventors: Shinichi Doi, Tokyo (JP); Koyo Uemura, Tokyo (JP); Satoko Itaya, Tokyo (JP); Yoshiaki Wakabayashi, Tokyo (JP); Satoru Oga, Tokyo (JP); Junich Miyamoto, Tokyo (JP); Hajime Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/824,095

(22) PCT Filed: Sep. 6, 2011

(86) PCT No.: PCT/JP2011/070246
§ 371 (c)(1),
(2), (4) Date: Mar. 15, 2013

(87) PCT Pub. No.: WO2012/043167
PCT Pub. Date: Apr. 5, 2012

(65) Prior Publication Data
US 2013/0179003 A1 Jul. 11, 2013

(30) Foreign Application Priority Data
Sep. 27, 2010 (JP) .................... 2010-216252

(51) Int. Cl.
*B60R 16/00* (2006.01)
*G06F 17/00* (2006.01)
*B60R 16/02* (2006.01)

(52) U.S. Cl.
CPC ............... *G06F 17/00* (2013.01); *B60R 16/02* (2013.01)

USPC ............ 701/1; 701/29.1; 701/29.6; 701/32.6; 701/33.1; 340/426.1

(58) Field of Classification Search
CPC ........... G07C 5/00; G07C 5/006; G07C 5/008
USPC ........... 701/29.1, 29.6, 31.4, 31.8, 32.9, 33.2, 701/34.4; 340/425
See application file for complete search history.

(56) References Cited

U.S. PATENT DOCUMENTS 5,521,588 A * 5/1996 Kuhner et al. ............. 340/12.28
5,661,473 A * 8/1997 Paschal ....................... 340/10.1
(Continued)

FOREIGN PATENT DOCUMENTS

JP 2005341528 A 12/2005
JP 2006193016 A 7/2006
(Continued)

OTHER PUBLICATIONS

The international search report for PCT/JP2011/070246 mailed on Oct. 25, 2011.

*Primary Examiner* — Jonathan M Dager
(74) *Attorney, Agent, or Firm* — Sughrue Mion, PLLC

(57) ABSTRACT

In order to allow the broader selection of modules that configure a vehicle, this information processing system, which is for checking a vehicle configured by combining a plurality of vehicle modules, is characterized by being provided with: a first judgment means that judges whether or not each vehicle module has been certified; a second judgment means that judges whether or not the combination of the plurality of vehicle modules can be certified; and a determination means that determines the conditions necessary for the combination of the plurality of vehicle modules to receive certification.

6 Claims, 15 Drawing Sheets

(56) References Cited

U.S. PATENT DOCUMENTS

| | | | |
|---|---|---|---|
| 5,991,673 A * | 11/1999 | Koopman et al. | 701/29.6 |
| 6,317,026 B1 * | 11/2001 | Brodine | 340/5.8 |
| 6,678,606 B2 * | 1/2004 | Akins et al. | 701/114 |
| 6,731,195 B2 * | 5/2004 | Nemoto | 340/5.2 |
| 6,840,445 B2 * | 1/2005 | Gatz | 235/385 |
| 6,888,462 B2 * | 5/2005 | Brodine | 340/568.1 |
| 7,039,511 B1 * | 5/2006 | Kreuz et al. | 701/36 |
| 7,042,346 B2 * | 5/2006 | Paulsen | 340/438 |
| 7,131,005 B2 * | 10/2006 | Levenson et al. | 713/170 |
| 7,137,001 B2 * | 11/2006 | Dabbish et al. | 713/168 |
| 7,325,135 B2 * | 1/2008 | Fehr et al. | 713/170 |
| 7,408,464 B2 * | 8/2008 | Brodine | 340/572.1 |
| 7,423,353 B2 * | 9/2008 | Hata | 307/10.3 |
| 7,549,046 B2 * | 6/2009 | Fehr et al. | 713/168 |
| 7,600,114 B2 * | 10/2009 | Reinold et al. | 713/156 |
| 7,684,908 B1 * | 3/2010 | Ogilvie et al. | 701/29.6 |
| 7,819,312 B2 * | 10/2010 | Gualandri | 235/382 |
| 8,078,357 B1 * | 12/2011 | Trytten et al. | 701/36 |
| 8,452,465 B1 * | 5/2013 | Sinha et al. | 701/2 |
| 2002/0023223 A1 * | 2/2002 | Schmidt et al. | 713/187 |
| 2003/0078701 A1 * | 4/2003 | Sunami et al. | 701/1 |
| 2005/0035852 A1 * | 2/2005 | Paulsen | 340/438 |
| 2005/0096934 A1 * | 5/2005 | Wakui et al. | 705/1 |
| 2005/0216902 A1 * | 9/2005 | Schaefer | 717/168 |
| 2005/0256614 A1 * | 11/2005 | Habermas | 701/1 |
| 2006/0107058 A1 * | 5/2006 | Lewis et al. | 713/176 |
| 2006/0152348 A1 * | 7/2006 | Ohtaki et al. | 340/426.1 |
| 2007/0067632 A1 * | 3/2007 | Kaihori | 713/169 |
| 2008/0033609 A1 * | 2/2008 | Razavi | 701/33 |
| 2008/0082427 A1 * | 4/2008 | Gandhi et al. | 705/28 |
| 2008/0284571 A1 * | 11/2008 | Wilbrink et al. | 340/10.1 |
| 2009/0005916 A1 * | 1/2009 | Wainwright et al. | 701/3 |
| 2009/0019008 A1 * | 1/2009 | Moore et al. | 707/3 |
| 2009/0249460 A1 * | 10/2009 | Fitzgerald et al. | 726/7 |
| 2009/0288175 A1 * | 11/2009 | Sun et al. | 726/35 |
| 2010/0217478 A1 * | 8/2010 | Zhang et al. | 701/33 |
| 2011/0119556 A1 * | 5/2011 | de Buen | 714/758 |
| 2011/0200193 A1 * | 8/2011 | Blitz et al. | 380/277 |
| 2011/0215758 A1 * | 9/2011 | Stahlin et al. | 320/109 |
| 2012/0023478 A1 * | 1/2012 | Schafer et al. | 717/107 |
| 2012/0041638 A1 * | 2/2012 | Johnson et al. | 701/33.1 |
| 2012/0123611 A1 * | 5/2012 | Grasso et al. | 701/1 |
| 2013/0104186 A1 * | 4/2013 | Dietz et al. | 726/1 |
| 2013/0132227 A1 * | 5/2013 | Bienias | 705/26.5 |
| 2013/0179689 A1 * | 7/2013 | Matsumoto et al. | 713/171 |
| 2013/0212659 A1 * | 8/2013 | Maher et al. | 726/6 |

FOREIGN PATENT DOCUMENTS

| | | |
|---|---|---|
| JP | 2006524377 A | 10/2006 |
| JP | 2007214696 A | 8/2007 |
| JP | 2009038584 A | 2/2009 |
| WO | 2004095238 A1 | 11/2004 |

* cited by examiner

FIG. 5

| CHECK RESULT | | | | CONTROL SETTING CHANGE/ SOFTWARE PATCH |
|---|---|---|---|---|
| BRAKE DISTANCE | CALORIC VALUE | ... | POWER CONSUMPTION AMOUNT | |
| ○ | ○ | | ○ | WITHOUT ANY CHANGE |
| △ | ○ | | ○ | BRAKE OR MOTOR CONTROL CHANGE |
| × | × | | ○ | CHANGE OF BRAKE MODULE ETC. |
| ⋮ | ⋮ | | ⋮ | ⋮ |

FIG. 13

| | SEAT POSITION | INTERIOR COLOR | VEHICLE DRIVING SOUND | TRAVELLING MODE | ... |
|---|---|---|---|---|---|
| VEHICLE MODULE COMBINATION 1 | aaa~bbb | BLACK, BEIGE | NO DRIVING SOUND EXISTS, DRIVING SOUND EXISTS | FUEL EFFICIENCY-WEIGHTED TRAVEL-WEIGHTED | |
| VEHICLE MODULE COMBINATION 2 | ccc~ddd | BLACK, BEIGE, RED | NO DRIVING SOUND, A, B | NOTHING | |
| VEHICLE MODULE COMBINATION 3 | eee~fff | BLACK, GRAY | NO DRIVING SOUND, A, C | NOTHING | |
| ... | ... | ... | ... | ... | |

1300

INFORMATION PROCESSING SYSTEM, METHOD FOR CHECKING VEHICLE, AND PROGRAM FOR CHECKING VEHICLE

This application is a National Stage Entry of PCT/JP2011/070246 filed Sep. 6, 2001, which claims priority from Japanese Patent Application 2010-216252 filed Sep. 27, 2010, the contents of all of which are incorporated herein by reference, in their entirety.

TECHNICAL FIELD

The present invention relates to a technology of checking a configuration of a vehicle.

BACKGROUND ART

In general, a philosophy of configuring a vehicle such as an automobile with a combination of modules exists, and, for example, there exists Patent literature 1. A scheme in which when modules configure a network inside the vehicle, respective modules certify each other by using an encryption key is disclosed in Patent literature 1. Further, a scheme in which controllers on a network certify each other, thereby allowing illegal parts to be excluded is disclosed in Patent literature 2.

In addition, the technology of taking a smooth control without duplicated functions, in consideration of a function of each module, is disclosed in Patent literature 3, and the technology of obtaining certification of each module (each software-based vehicle part) by a certification center is disclosed in Patent literature 4.

CITATION LIST

Patent Literature

PTL 1: JP 2005-341528A
PTL 2: JP 2007-214696A
PTL 3: JP 2006-193016A
PTL 4: Japanese Translation of PCT International Application 2006-524377A

SUMMARY OF INVENTION

Technical Problem

However, the above-described technologies assume a method of excluding the modules that have not been certified or cannot be certified, whereby a user does not use the modules other than the certified module, and hence a degree of freedom of selecting the modules is narrow. For example, when a user is about to realize a favorite riding feeling etc., there is a case in which it cannot be realized with a combination of the certified modules.

The present invention has been accomplished in consideration of the above-mentioned problems, and an object of the present invention is to provide a technology of solving the above-mentioned problems, namely, a technology of increasing a degree of freedom of selecting the modules.

Means for Solving Problem

The present invention for solving the above-mentioned problems is an information processing system for checking a vehicle configured by combining a plurality of vehicle modules, is characterized in including a first judgment means that judges whether or not each vehicle module has been certified, a second judgment means that judges whether or not the aforementioned combination of a plurality of the vehicle modules can be certified, and a determination means that determines conditions necessary for the aforementioned combination of a plurality of the vehicle modules to receive certification.

So as to achieve the above-mentioned object, the vehicle relating to the present invention is characterized in including the above-mentioned system.

The present invention for solving the above-mentioned problems is a method of checking a vehicle configured by combining a plurality of vehicle modules, is characterized in including a judgment step of judging whether or not each vehicle module has been certified, a judgment step of judging whether or not the aforementioned combination of a plurality of the vehicle modules can be certified, and a determination step of determining conditions necessary for the aforementioned combination of a plurality of the vehicle modules to receive certification.

So as to achieve the above-mentioned object, the program relating to the present invention, which is a program for checking a vehicle configured by combining a plurality of vehicle modules, is characterized in causing a computer to execute a judgment step of judging whether or not each vehicle module has been certified, a judgment step of judging whether or not the aforementioned combination of a plurality of the vehicle modules can be certified, and a determination step of determining conditions necessary for the aforementioned combination of a plurality of the vehicle modules to receive certification.

Advantageous Effect of Invention

The present invention makes it possible to select the modules configuring the vehicle in a wider manner.

BRIEF DESCRIPTION OF DRAWINGS

FIG. 5 is a view illustrating a correspondence between a check result and a proposed content in the check system relating to the second exemplary embodiment of the present invention.

FIG. 13 is a view illustrating an example of a table in the check system relating to a third exemplary embodiment of the present invention.

DESCRIPTION OF EMBODIMENTS

Hereinafter, the exemplary embodiments of the present invention will be illustratively explained in details by referencing the accompanied drawings. However, the constituent element described in the following exemplary embodiments is only an exemplification, and there is no intention of limiting the technological scope of the present invention to hereto. Additionally, in the following description, the so-called "vehicle" is a concept of a vehicle including all moving devices irrespective of the number of wheels.

(First Exemplary Embodiment)

Figure 1:
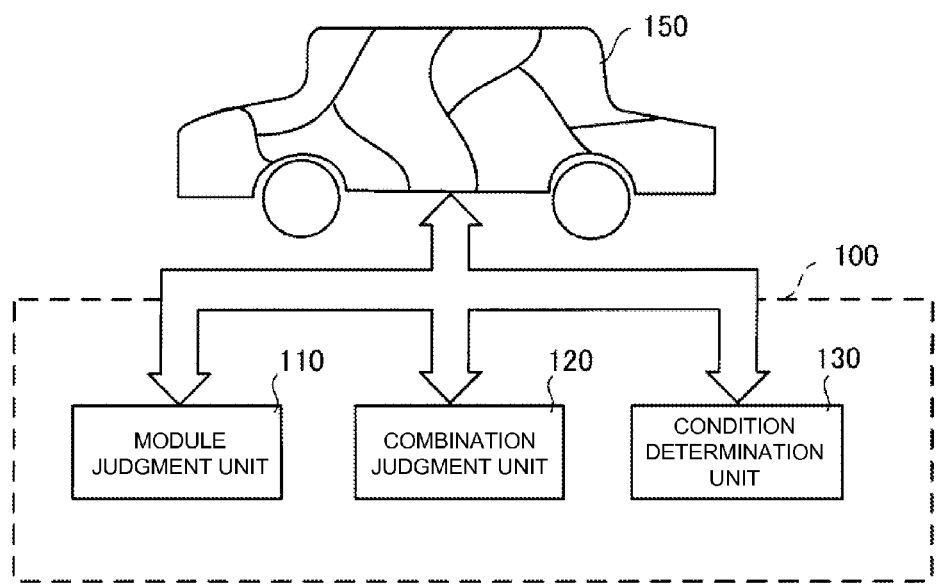
FIG. 1 is a block diagram illustrating a configuration of the information processing system relating to a first exemplary embodiment of the present invention.

As the first exemplary embodiment of the present invention, an information processing system 100 for checking the vehicle configured of a combination of a plurality of the vehicle modules will be explained by employing FIG. 1. FIG. 1 is a block diagram illustrating a configuration of the information processing system 100. In FIG. 1, the information processing system 100 includes a module judgment unit 110, a combination judgment unit 120, and a condition determination unit 130.

The module judgment unit 110 judges whether or not each vehicle module configuring a vehicle 150 has been certified. Further, the combination judgment unit 120 judges whether or not the combination of a plurality of the vehicle modules can be certified. In addition, the condition determination unit 130 determines conditions necessary for the combination of a plurality of the vehicle modules to receive certification.

In such a manner, not only the certification of the vehicle modules is judged one by one, but also the appropriateness of the above combination is judged, and furthermore, the condition necessary for obtaining the certification is determined, whereby the vehicle modules configuring the vehicle can be selected in more simplified manner.

(Second Exemplary Embodiment)

As the second exemplary embodiment of the present invention, the vehicle configured of a plurality of the vehicle modules, and the check system, being one example of the information processing system, that checks the above vehicle will be explained by employing FIG. 2 to FIG. 11. In this exemplary embodiment, as one example, a case in which an electric automobile is modularized and a user obtains each vehicle module to assemble it in some cases and to modify it in some cases is supposed. As the vehicle module, a driving-system module, a controlling-system module, a body module, an electric-equipment module, a cooling-system module, and the like can be listed; however, the vehicle module is not limited hereto, and any method of dividing and modularizing the electric automobile may be used so long as the divided part unit is configured of one part or more.

[Configuration]

Figure 2:
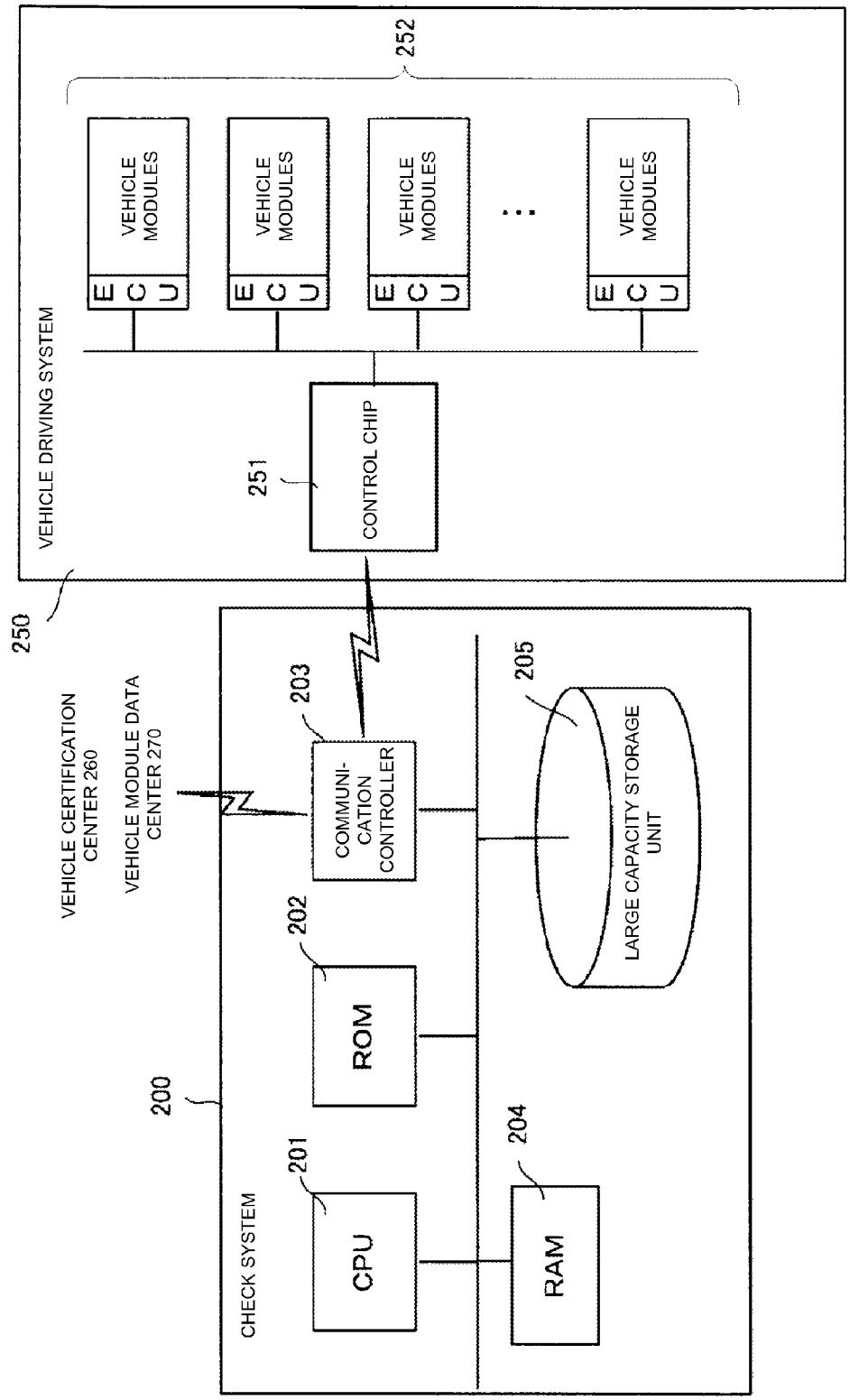
FIG. 2 is a view illustrating configurations of a check system and a vehicle driving system relating to a second exemplary embodiment of the present invention.

FIG. 2 shows an internal configuration of a check system 200, and an internal configuration of a vehicle driving system 250 for driving the vehicle.

The check system 200 is connected to the vehicle driving system 250 in the inside or the outside of the vehicle. As the check system 200, a general-purpose computer may be employed. In this case, the check system 200 includes a CPU 201, a ROM 202, a communication controller 203, a RAM 204, and a large capacity storage unit 205. The CPU 201, which is a central processing unit, executes various programs, thereby to control an entirety of the check system 200 all the more.

The ROM 202, which is a read only memory, stores various parameters etc. in addition to a boot program that the CPU 201 firstly should execute. Further, the RAM 204, which is a random access memory, has a development region of the program read out from the large capacity storage unit 205, and a temporary storage region for storing data to be employed by the above program, derived data, data inputted via the communication controller 203, and the like. The large capacity storage unit 205 stores various databases and the program modules. Further, the communication controller 203 controls communication with the vehicle driving system 250, and communication with a vehicle certification center 260 and a vehicle module data center 270 via a network.

On the other hand, the vehicle driving system 250 includes a control chip 251, and a plurality of vehicle modules 252. Each of these vehicle modules 252 includes an ECU (Electrical Control Unit). Respective ECUs, which are connected to a network, can mutually communicate and yet can communicate with the control chip 251. Each vehicle module has a tamper-resistant certification chip embedded therein, and a mechanism in which the control chip 251 can judge whether or not each vehicle module has been certified is employed. Or, the ECU of the vehicle module may be caused to have an already-certified ID such as an MAC address that is uniquely decided. Employing such a mechanism makes it possible to realize traceability of the parts, and to prevent the parts from being stolen.

In such a system, the check system 200 controls the vehicle module 252 via the control chip 251 in a linkage with the vehicle driving system 250. In particular, the check system 200 checks, for each of the vehicle modules 252, whether or not the above vehicle module is a certificated vehicle module, whether no problem with a performance exists, and whether no problem with compatibility of a plurality of the vehicle modules exists. In addition, the check system 200 checks whether or not each vehicle module exhibits an appropriate performance as the vehicle configured by combining the vehicle modules. Further, when this check system 200 finds a problem, it notifies to the user countermeasures (exchange of the vehicle module, installment, update, and control setting of a driver software, and the like) that a user can take in order to solve the above problem.

Figure 3:
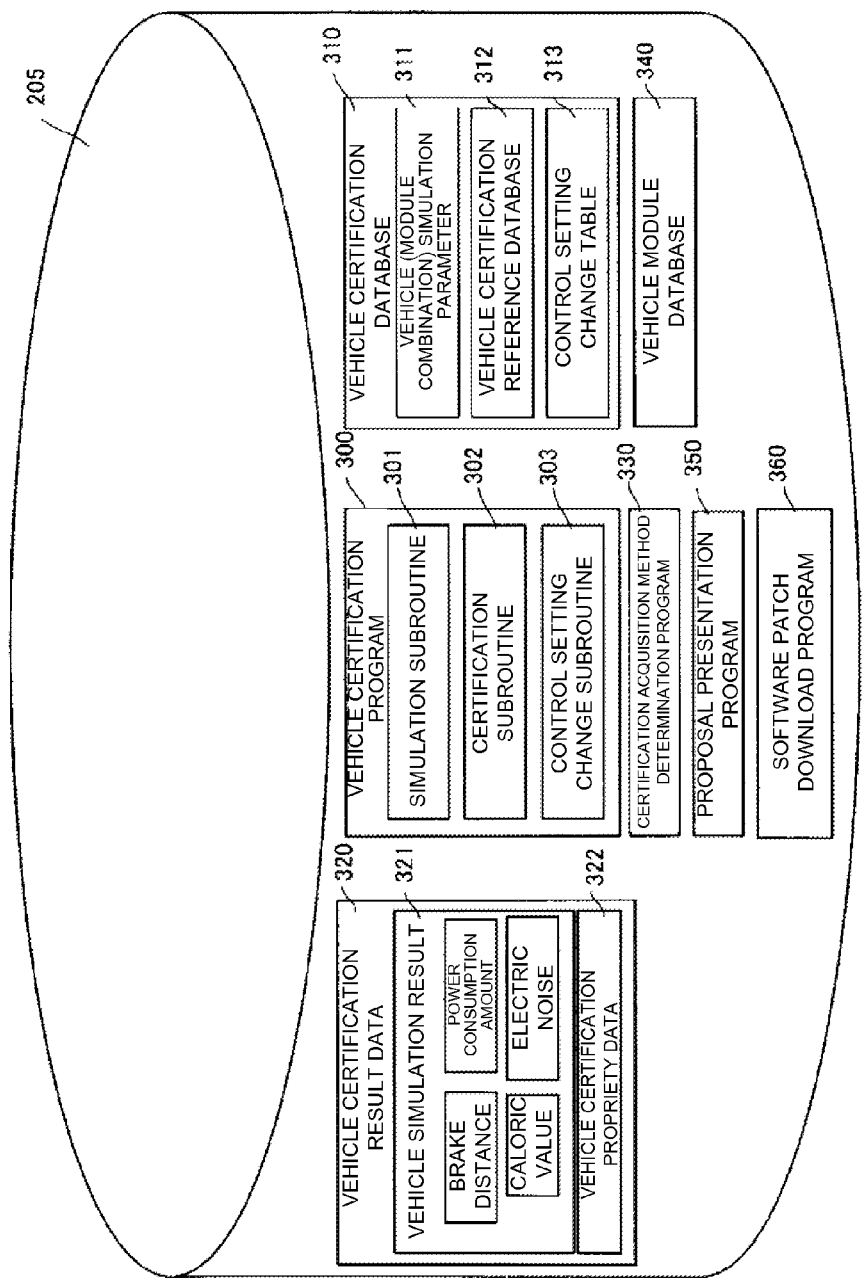
FIG. 3 is a view illustrating data to be stored into the check system relating to the second exemplary embodiment of the present invention.

FIG. 3 is a view illustrating an internal configuration of the large capacity storage unit 205 in the check system 200 of FIG. 2. As shown in FIG. 3, the large capacity storage unit 205 stores a vehicle certification program 300, a vehicle certification database 310, and vehicle certification result data 320 with regard to the vehicle certification. Further, besides, the large capacity storage unit 205 preserves a certification acquisition method determination program 330, a vehicle module database 340, a proposal presentation program 350, and a software patch download program 360.

Figure 4:
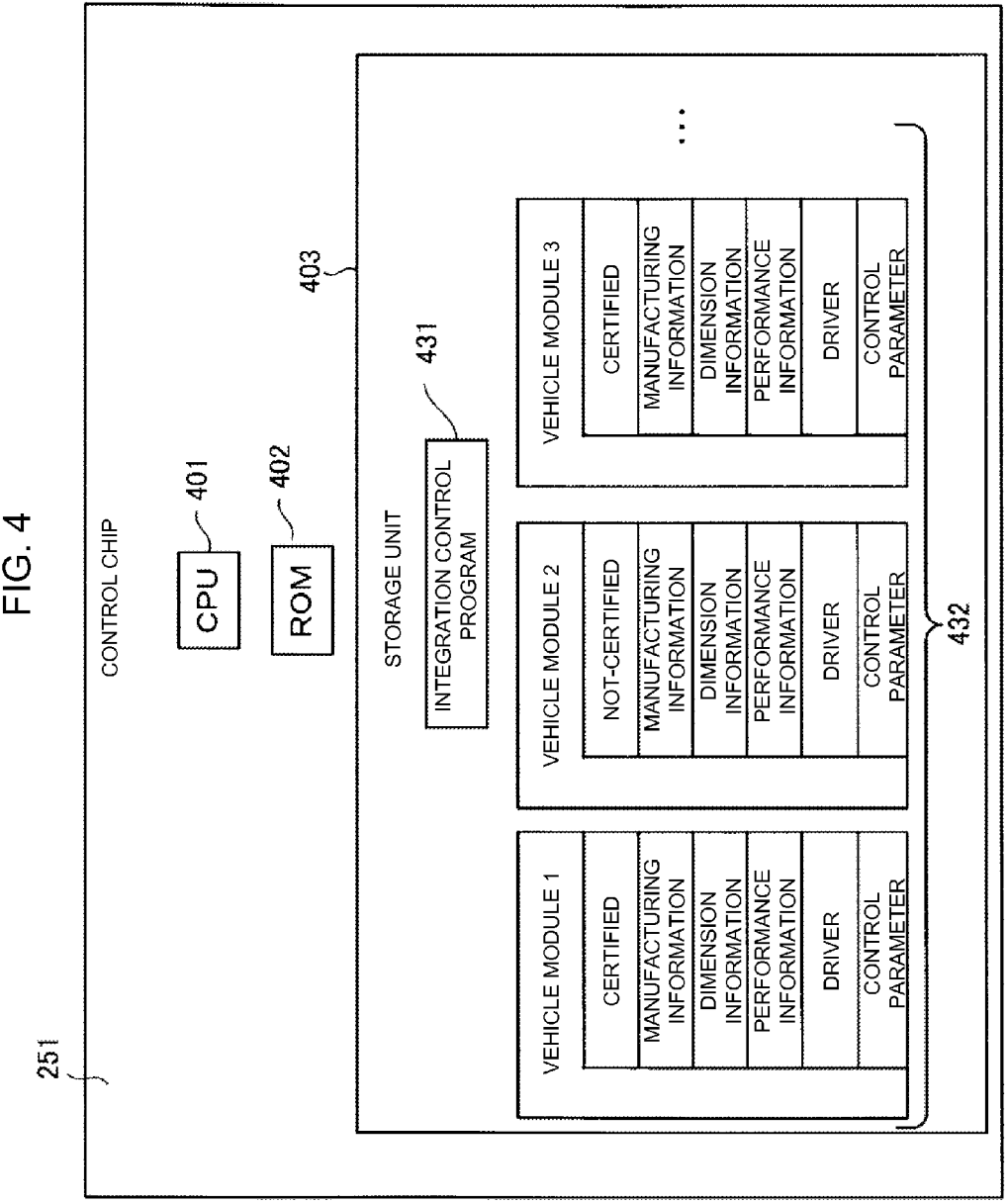
FIG. 4 is a view illustrating data to be stored into a control chip relating to the second exemplary embodiment of the present invention.

FIG. 4 is a view illustrating a configuration of the control chip 251. The control chip 251 includes a CPU 401, a ROM 402, and a storage unit 403. Vehicle module information 432 in addition to an integration control program 431 is stored into the storage unit 403. As the vehicle module information 432, manufacturing information such as a manufacturing date and a manufacturing source is registered beside a flag indicating whether or not the vehicle module has been certified (whether a correspondence ECU has a certification code) for each vehicle module. Further, besides, dimension information, performance information, a driver program, and a control parameter of each vehicle module, and the like are stored. The CPU 401 executes the integration control program 431, thereby to integrally control a plurality of the vehicle modules by employing this vehicle module information 432.

FIG. 5 is a view illustrating a configuration of a control setting change table 313 in the vehicle certification database 310. As shown in 501 of FIG. 5, when there is a minor problem with a brake distance (when a difference with a reference value is within a constant value), a countermeasure is taken in such a manner that a control of a brake or a motor is changed. For example, it is thinkable to restrict an output of the motor in some cases, and to quicken a response of the brake in some cases. Specifically, a countermeasure is taken in such a manner that the software patch is downloaded from the vehicle module data center 270 via the communication controller 203 to update the driver program itself of the motor and the brake in some cases and to change a setting value of the driver program in some cases. On the other hand, when not only the brake distance but also a caloric value deviates from a reference by a constant value or more, a change to the brake module etc. is proposed to a user because it is impossible to cope therewith by updating the software and changing the control setting.

[Flow of the Process]

Figure 6:
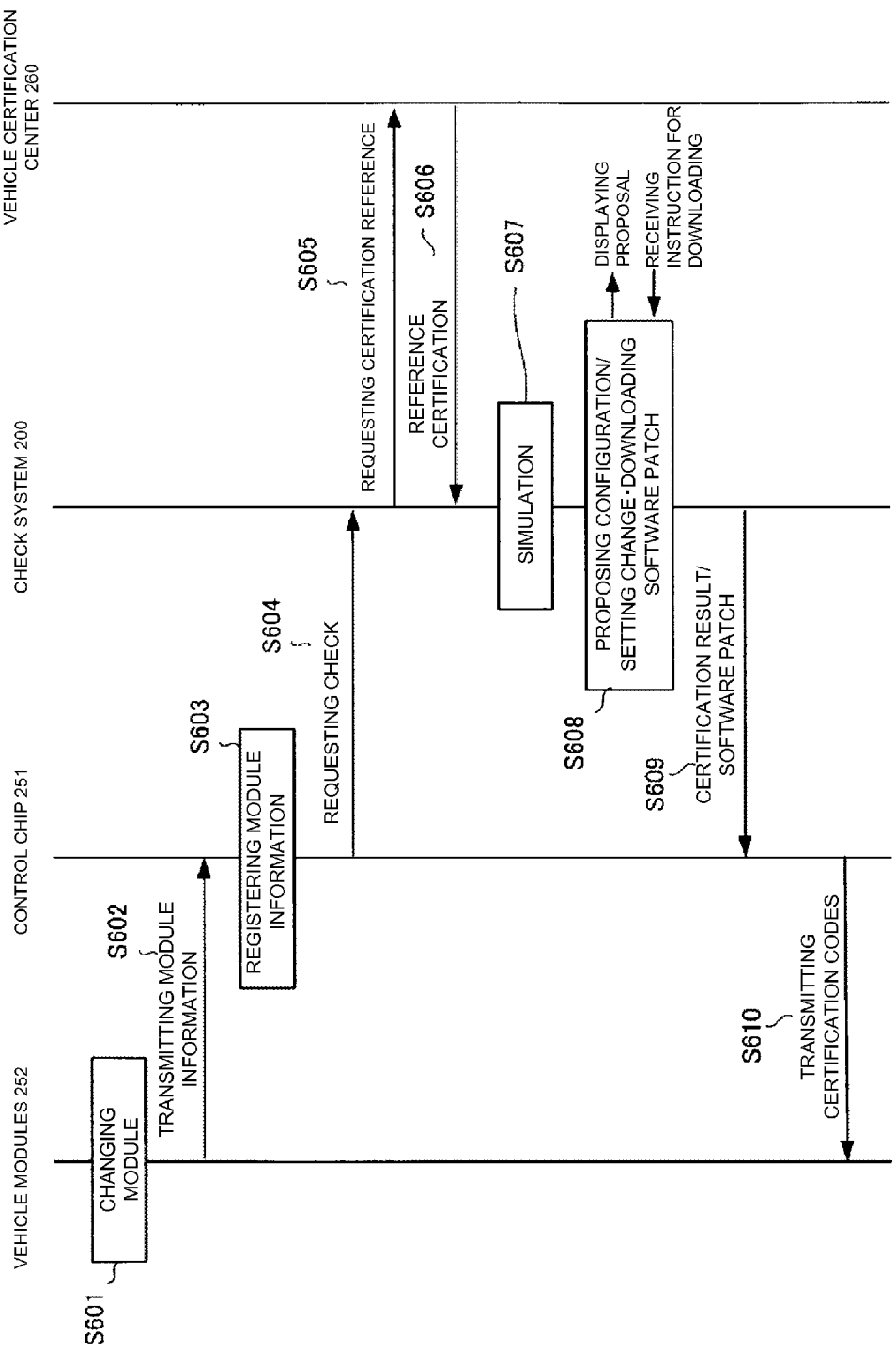
FIG. 6 is a sequence diagram illustrating a processing procedure in the check system relating to the second exemplary embodiment of the present invention.

FIG. 6 is a view for explaining a flow of the process in an entirety of the system at the time of changing the vehicle module. When a change to the vehicle module is performed (S601), the ECU of the vehicle module subjected to the change transmits vehicle module information to the control chip 251 (S602). Or, the control chip 251, which monitors all vehicle modules, requests a new vehicle module for the vehicle module information, and acquires it when a change to the vehicle module is performed.

The control chip 251 registers the acquired vehicle module information into the storage unit 403 (S603), and requests the check system 200 to check a new vehicle module (S604).

The check system 200 appropriately requests the vehicle certification center 260 for a certification reference (S605), downloads the certification reference from the vehicle certification center 260 (S606), and registers it into a vehicle certification reference database 312. Additionally, herein, an example of inquiring of the external vehicle certification center 260 is shown; however, the present invention is not limited hereto, and the vehicle certification reference database 312 inside the large capacity storage unit 205 may be referenced.

Next, in a step S607, the CPU 201 of the check system 200 executes a simulation subroutine 301 of the vehicle certification program 300, thereby to perform a simulation in a new combination of the vehicle modules. In this simulation, the CPU 201 of the check system 200 employs a vehicle simulation parameter 311 stored into the vehicle certification database 310. For example, when the new vehicle module is a battery, the CPU 201 actually rotates the motor at a predetermined rotational number, and checks an output, a caloric value, and generated noise thereof. At this time, tires may be rotated, or tires may not be rotated. Or, when the new vehicle module is an audio, the CPU 201 starts the above audio, and checks the consumption power, the caloric value, and the generated noise. It is assumed that all these check items are prepared in the vehicle certification reference database 312. Additionally, when a reliability of the vehicle module information registered in the step S603 is high, and sufficient data about the newly introduced vehicle module is arranged, the CPU 201 perform the simulation in a software manner by employing an operational model prepared for each single body of the vehicle module. Further, when the newly introduced vehicle module has been certificated, and it has been already certificated that no problem with its operation and a compatibility with other vehicle modules exists, the CPU 201 may permit the use thereof without performing the simulation. In that case, when combinations of the already-certified vehicle modules are stored into the vehicle certification reference database 312 of FIG. 3 in a plural number, and a coincidence with any one of the above combinations exists, the CPU 201 returns a result stating that vehicle is certifiable to the control chip 251 as a reply without performing the simulation.

Continuously, the CPU 201 of the check system 200 executes a certification subroutine 302, thereby allowing a numerical value, being a simulation result, to be compared with a reference value stored into the vehicle certification reference database 312. And, the above result is stored as a vehicle simulation result 321 of FIG. 3. In FIG. 3, the brake distance, the caloric value, the power consumption amount, and the electric noise are listed as the check item; however, the present invention is not limited hereto, and other items may be checked.

In a step S608, a result of the simulation is presented to a user. At this time, the certification acquisition method determination program determines how to solve the items that have not satisfied the certification reference by referencing the control setting change table 313 shown in FIG. 5, and the proposal presentation program 330 presents the above proposal. When it is possible to solve by downloading the software patch (for example, a newest driver), the software patch download program 360 downloads the software patch from the vehicle module data center 270 etc. responding to a suggestion by a user. On the other hand, when it is necessary to exchange the vehicle module itself, the check system 200 retrieves an alternate vehicle module, being a replacement target for receiving the certification, from a vehicle module database 340 that it has, and provides a list thereof, responding to a user's instruction. Depending upon the case, the communication controller 203 downloads a list of the alternate vehicle modules conforming to a reference from the vehicle module data center 270. At this time, the check system 200 may propose different alternate vehicle module according to how the user drives and which vehicle the user desires to obtain. Additionally, herein "the so-called presentation" is a concept including all aspects for providing information to the user by use of display on a monitor in the vehicle, notification by sound, and the like.

In a step S609, the certification result is preserved in the large capacity storage unit 205 as vehicle certification propriety data 322, and besides, is transmitted to the control chip 251. When the downloaded software patch exists, the above software patch is transmitted to the control chip 251. The control chip 251 updates the integration control program 431 and the driver of each vehicle module with the transmitted software patch. Or, when the certification is OK, the control chip 251 transmits a certification code to the newly introduced vehicle module (S610).

Figure 7:
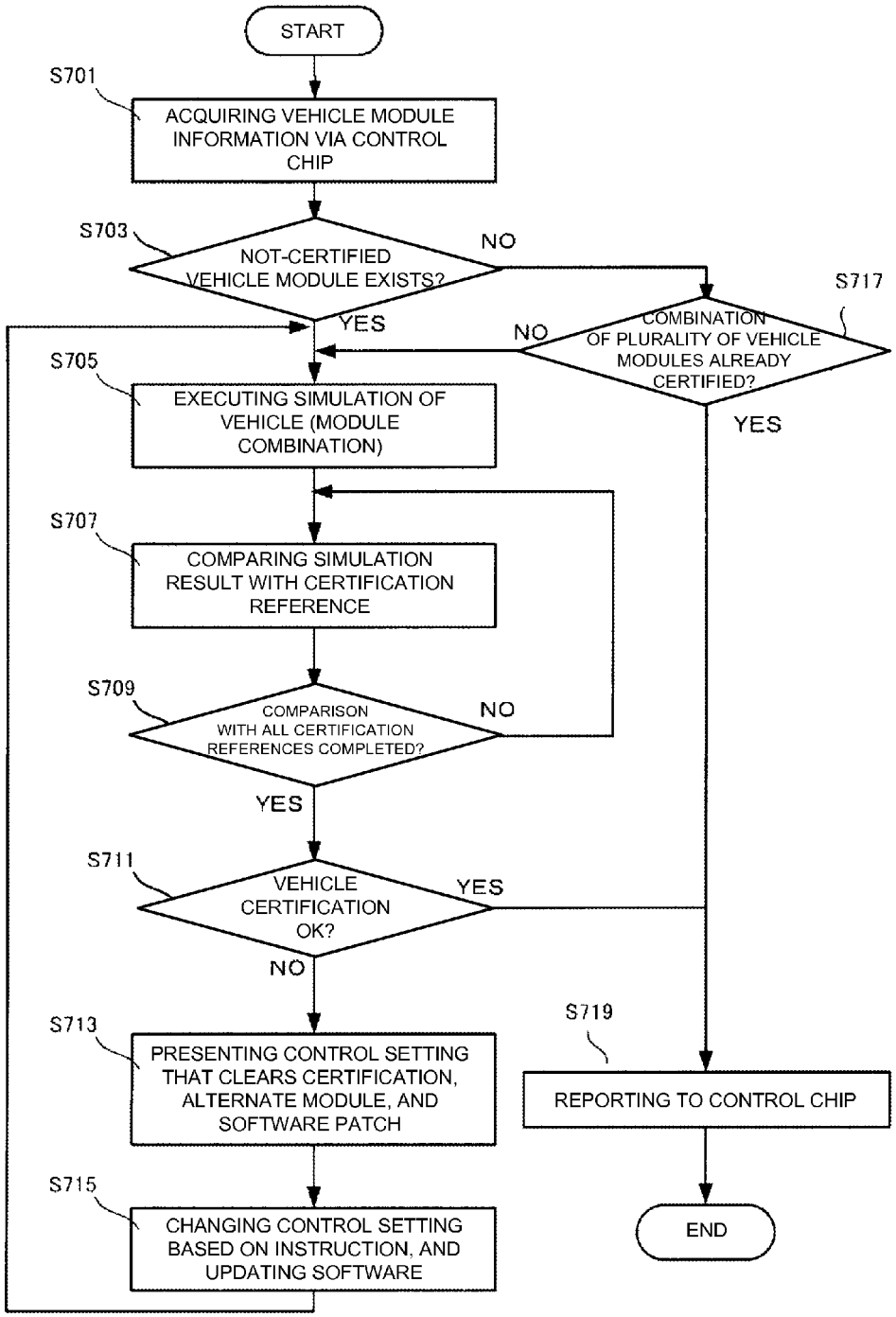
FIG. 7 is a flowchart illustrating a processing procedure in the check system relating to the second exemplary embodiment of the present invention.

FIG. 7 is a flowchart for explaining a flow of the process that the CPU 201 of the check system 200 performs.

At first, as a step S701, the CPU 201 acquires the vehicle module information 432 via the control chip 251 with regard to the vehicle module. The CPU 201 may acquire information on all vehicle modules beside the newly introduced vehicle module. Next, in a step S703, the CPU 201 checks the certification of each vehicle module to judge whether or not the not-certified vehicle module exists. When the not-certified vehicle module does not exist, the CPU 201 judges whether or not a combination of a plurality of the vehicle modules configuring the above vehicle has been certified (S717). When it has already confirmed that the combination of the vehicle modules can be also traveled without any problem, for example, when the vehicle module that a vehicle manufacturer recommends is introduced, the operation proceeds to a step S719 to report its effect to the control chip 251.

When the not-certified vehicle module exists, or when a combination with other vehicle modules has not been certificated even though the vehicle module has been certificated as a single body, the operation proceeds to a step S705 to execute the simulation, and its result is accumulated as a vehicle simulation result 321. And, in a step S707, the CPU 201 compares the vehicle simulation result 321 with the vehicle certification reference database 312 to judge whether it satisfies a reference. In a step S709, the CPU 201 judges whether a comparison between the vehicle simulation result 321 and all certification references is completed. The step S707 is repeated until a comparison with all certification references is completed, and the operation proceeds to a step S711 to judge whether or not the certification is OK as an entirety of the vehicle when a comparison with all certification references is completed. As a result, the operation proceeds from the step 711 to a step 719 to report its effect to the control chip 251 when the certification is OK as an entirety of the vehicle.

When it was impossible to clear the certification with regard to some items, the CPU 201 presents its result to the user in a step 713, and besides, reports the control setting, the alternated vehicle module, existence of the software patch, and the like so as to clear the certification. When it is possible to cope therewith by the setting and a change of the software, the CPU 201 changes the control setting and updates the software based on an instruction by the user in a step S715.

For example, one example of a screen for displaying the check result is shown in FIG. 9 to FIG. 12. The caloric value of the motor, the caloric value of the battery, a capacity of a cooler, and the like are shown as a numerical value in a check result display screen 901 of FIG. 9, and it is displayed as a message that no problem exists as a whole.

Figure 10:
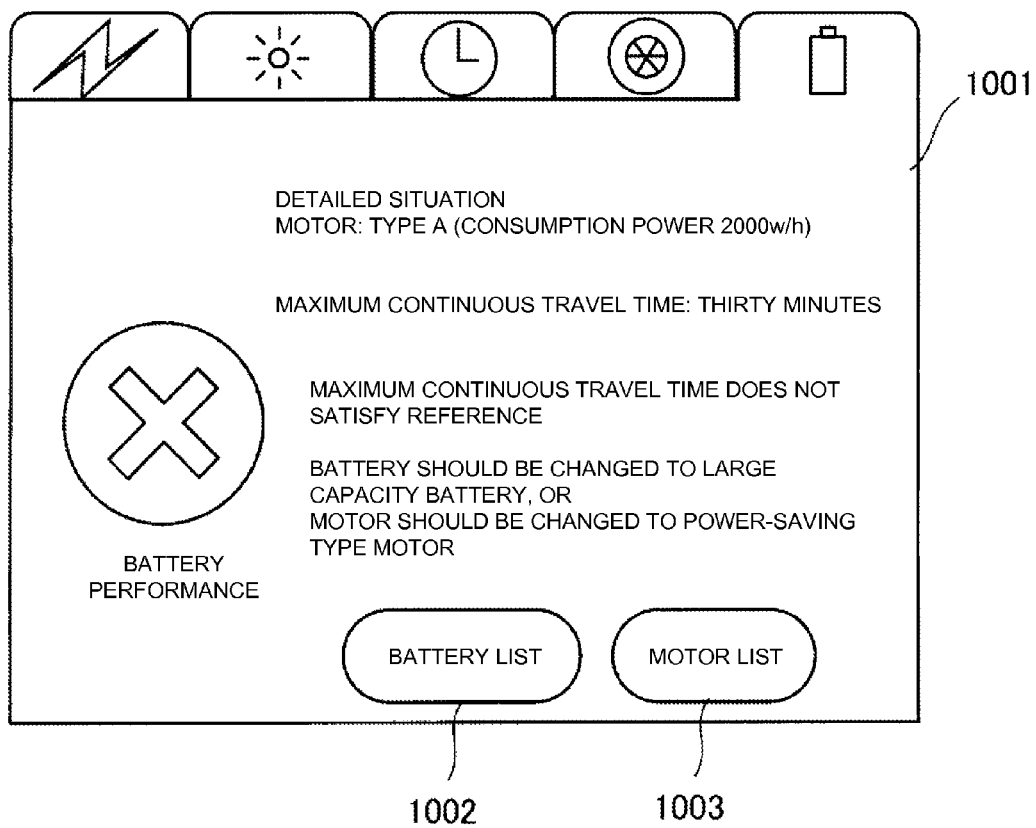
FIG. 10 is a view illustrating an example of a display screen of the check result in the check system relating to the second exemplary embodiment of the present invention.

On the other hand, the consumption power of the motor, a maximum continuous travel time, and the like are shown in a check result display screen 1001 of FIG. 10 as an index for evaluating the check result of the battery performance. Herein, it is announced that the maximum continuous travel time, which is thirty minutes, is short, and does not satisfy a reference value. Besides, it is proposed to exchange the battery or the motor as a solving method. When a battery list button 1002 or a motor list button 1003 is clicked, the check system 200 retrieves the battery and the motor, being an alternate, from the internal vehicle module database 340 or the external vehicle module data center 270 and shows them. Specifically, in this case, the check system 200 retrieves and displays the motor having a small consumption power or the battery having a large capacity.

Figure 11:
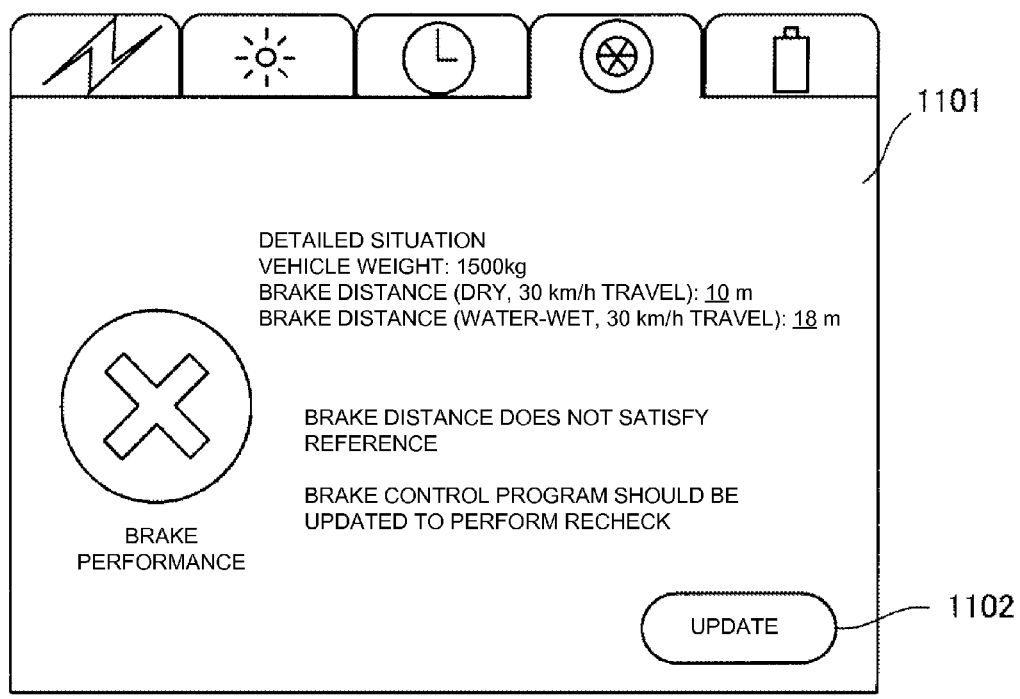
FIG. 11 is a view illustrating an example of a display screen of the check result in the check system relating to the second exemplary embodiment of the present invention.

The check result of the brake performance is shown in a check result display screen 1101 of FIG. 11. Herein, a vehicle weight and the brake distance are shown as an element relating to the brake performance, and a message for urging the update of the brake control program is shown because the brake distance does not meet a reference. When an update button 1102 is clicked, an updating process of the brake control program is started. Besides, a message for urging an exchange of the vehicle module so that the vehicle weight is made light may be shown. In addition, a message for urging the download of the software that restricts the travel performance (for example, restricts the maximum speed) may be shown.

Figure 12:
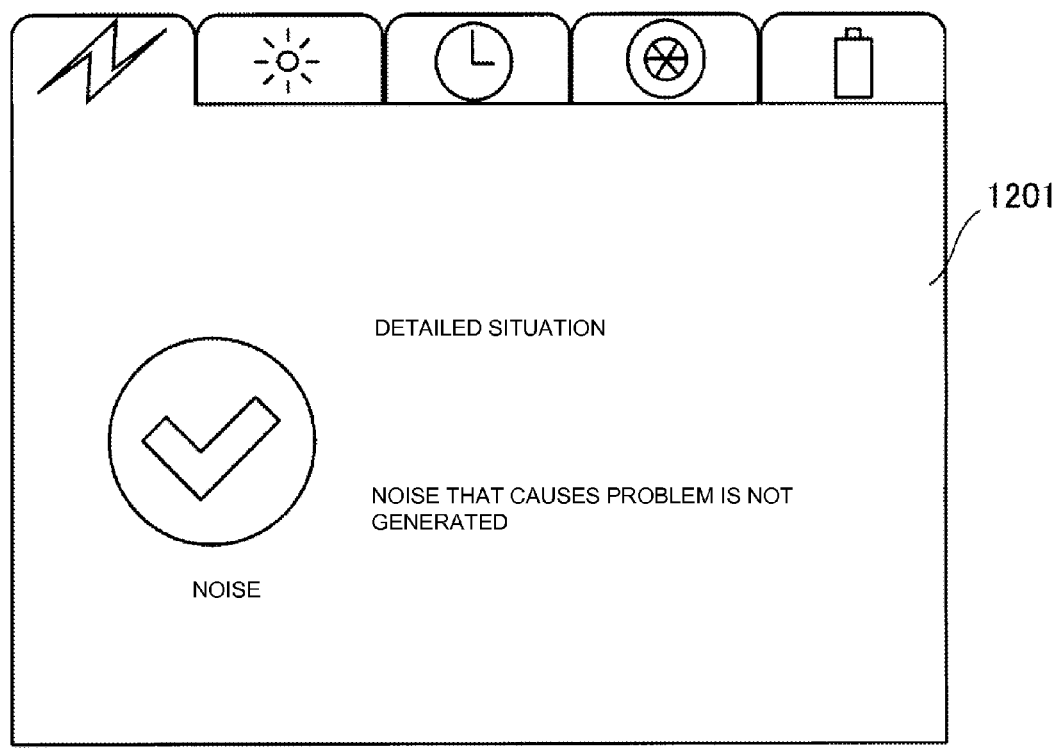
FIG. 12 is a view illustrating an example of a display screen of the check result in the check system relating to the second exemplary embodiment of the present invention.

The check result of the noise to be generated from the vehicle module is shown in a check result display screen 1201 of FIG. 12. Herein, an effect that no problem with the generated noise exists is shown.

Figure 8:
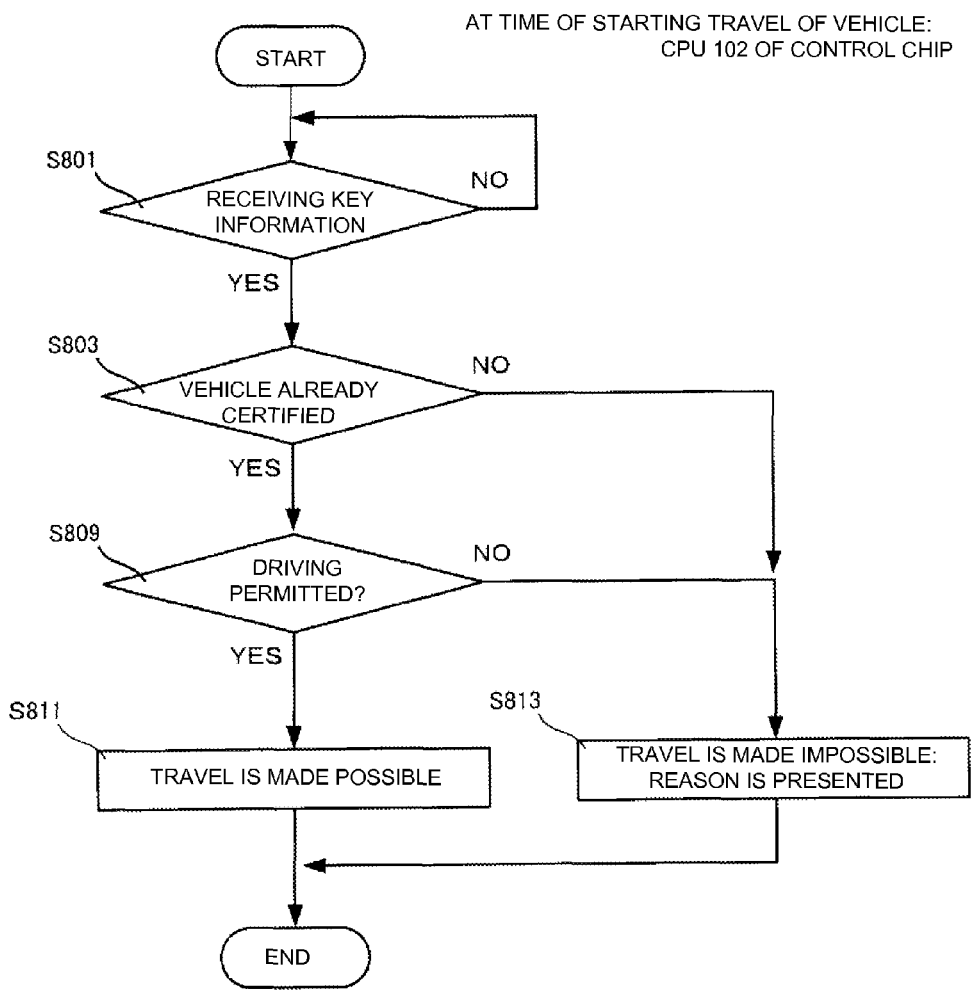
FIG. 8 is a flowchart illustrating a processing procedure in the vehicle driving system relating to the second exemplary embodiment of the present invention.
Figure 9:
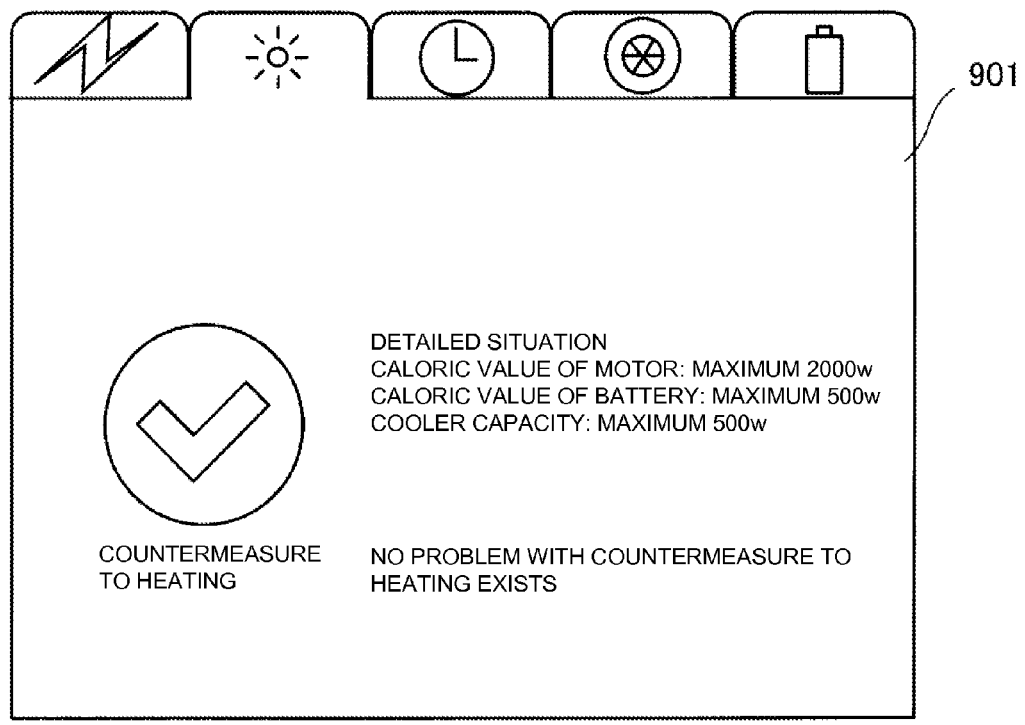
FIG. 9 is a view illustrating an example of a display screen of the check result in the check system relating to the second exemplary embodiment of the present invention.

FIG. 8 is a flowchart for explaining a flow of the process that the CPU 401 of the control chip 251 performs by executing the integration control program 431 at the time of starting the travel of vehicle.

When the CPU 401 receives key information (for example, information preserved in an electric driver's license) in a step S801, it judges whether or not the certification by the check system 200 has been completed as an entirety of the vehicle in a step S803. Next, in a step S809, the CPU 401 judges whether the driving of the above vehicle by the above driver should be permitted by collating with the content of the electric driver's license and the like. For example, the CPU 401 judges whether a motor output is within a range of a user's driving qualification. When the CPU 401 has judged that the driving can be permitted, the operation proceeds to a step S811 to start the travel. When the driving cannot be permitted, the operation proceeds to a step S813 to make the travel of the vehicle impossible, and its reason is presented to the user.

As explained above, this exemplary embodiment makes it possible to select the vehicle modules configuring the vehicle in a more simplified manner because the certification of the vehicle module is judged one by one, an appropriateness of the above combination is furthermore judged, and the condition necessary for obtaining the certification is determined in addition hereto.

Additionally, in the above-mentioned exemplary embodiment, when the vehicle module that does not meet the certification reference exists, the download of the software, the exchange of the hardware, and the like are proposed to the user; however, other change options may be suggested when they satisfy the reference. For example, a modification such that a parameter set applicable to the current combination of the vehicle modules is downloaded to customize a riding feeling of the vehicle and the like is thinkable.

(Third Exemplary Embodiment)

The third exemplary embodiment of the present invention will be explained by employing FIG. 13. FIG. 13 is a view illustrating a combination table 1300 of the module combination and the customized data. The information processing system relating to this exemplary embodiment previously sets a width of the customization by the user such as a moving range of a seat position at the time of the riding, an interior color, a driving operation sound, and a travel mode for each vehicle module combination. Thus, when the vehicle module is changed and hence, the vehicle module combination is changed, the seat position adjustable in the above vehicle, the interior color, the driving operation sound, the travel mode and the like result in being changed. A configuration and an operation other than this are similar to those of the above-described second exemplary embodiment, so its explanation is omitted herein.

In a table 1300 shown in FIG. 13, for example, the seat position is movable between aaa to bbb with a vehicle module combination 1, the seat position is movable between ccc to ddd with a vehicle module combination 2, and the seat position is movable between eee to fff with a vehicle module combination 3. With the vehicle module combination including a stiff suspension, the customization width is prepared so that the seat position can be adjusted in a low position in order to make a rolling movement small.

Likewise, the interior color and the vehicle driving sound are also prepared for each vehicle module combination. In addition, any travel mode of a fuel efficiency-weighted mode and a travel-weighted mode can be selected with the vehicle module combination 1; however, the setting is made so that such a selection cannot be made in vehicle module combination 2 and the vehicle module combination 3.

As explained above, the customization width is set for each vehicle module combination, whereby the user can select the vehicle module combination and among all, the vehicle module itself in consideration of such a customization width.

(Fourth Exemplary Embodiment)

Figure 14:
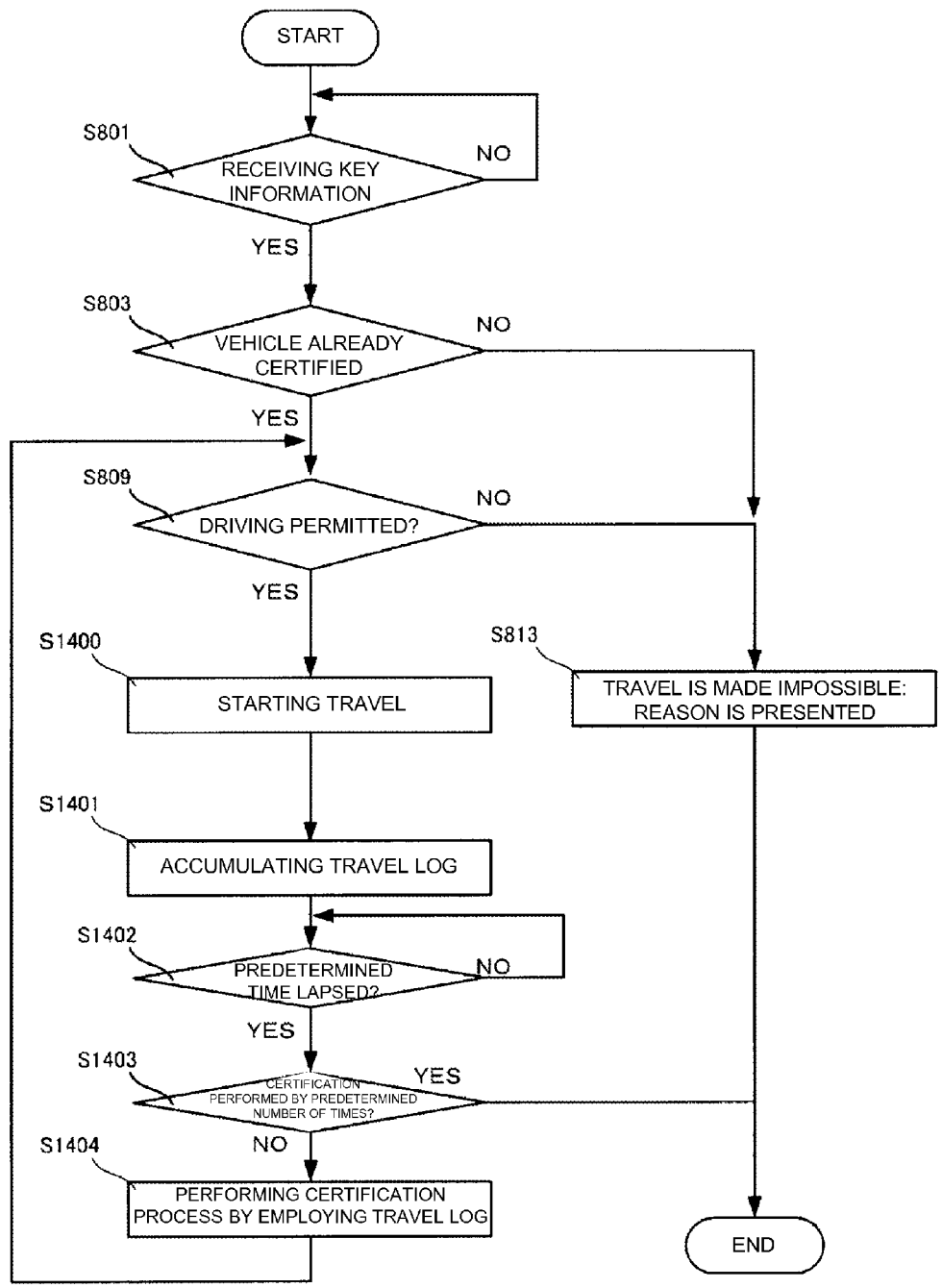
FIG. 14 is a flowchart illustrating a processing procedure in the check system relating to a fourth exemplary embodiment of the present invention.

The fourth exemplary embodiment of the present invention will be explained by employing FIG. 14. In this exemplary embodiment, a trend of degradation is detected by monitoring an operational situation of the parts. FIG. 14 is a view for explaining a flow of the process in the information processing system relating to this exemplary embodiment. One part of the process is similar to a flowchart of FIG. 8, so an identical code is affixed to an identical process and its explanation is omitted.

It is thinkable that the operational part is subjected to aging degradation due to long-period use. Thereupon, when the certification of the vehicle is finished in the step S803 and the travel is started in a step S1400, the operation proceeds to a step S1401 to accumulate a travel log. Next, when a passage time from the travel start is measured and a predetermined time lapses, the operation proceeds from a step S1402 to a step S1403 and it is judged whether the certification process has been finished by a predetermined number of times. For example, if the above vehicle module combination has been already certified by five times, it is judged that there is no problem with the above vehicle module combination and the process is finished. At this time, the above vehicle module combination may be registered into the vehicle module database 340 etc. as a vehicle module combination having no problem with the travel. In such a manner, thereafter, the above vehicle module combination can be introduced into other drivers who select an identical combination as a combination for which the certification has been completed after a considerable large number of the actual travels.

On the other hand, when the certification process has been finished by a predetermined number of times in a step S1403, the operation proceeds to a step S1404 to perform the certification process by use of the travel log. The operation returns to a step S809 to judge again whether or not the driving should be permitted responding to its result.

Further, it is also possible to compare an operational model (initial performance) employed for the simulation with the actual operational situation and to detect the aging degradation according to magnitude of the difference. A difference of the operational situation might occur in a short term, dependent upon a change in the operational environment; however a more precise extent of the degradation can be measured if the long-term operation is monitored to introduce an entire tendency with the computation method such as root mean square.

It is detected that it is expected that a difference between the current operational situation and the operational model (initial performance) has exceeded a predetermined constant range, or exceeds a predetermined constant range from a gradient of a graph and the like. And, an exchange period of the parts of which the current operational situation has exceeded a predetermined range etc. (for example, a drop of the initial performance by 10%) or the parts of which the current operational situation is expected to exceed a predetermined range etc. is displayed in a monitor, thereby allowing the exchange period to be notified to the user.

Further, the operation of the module is restricted so that the current operational situation converges into a predetermined range (for example, a drop of the initial performance by 10%). The control by a by-wire is premised. For example, a control for making a ratio of a leg-force of a brake pedal and the brake distance constant is taken for degradation in the brake. This exemplary embodiment can be performed with the system configured of the brake pedal, a device for converting the leg-force of the pedal into an electric signal, a device for changing the above electric signal into a tightening strength of a brake pad, a brake body, and a vehicle speed sensing system (a general-purpose speed detection system is acceptable).

When the brake degrades, the brake distance is extended with a constant leg-force; however adjusting the strength of the brake for the leg-force allows a change in the brake distance due to the degradation to be offset. In the device for converting the leg-force of the pedal into the electric signal or the device for changing the above electric signal into the tightening strength of a brake pad, changing a conversion coefficient of the tightening strength of the brake pad for the leg-force allows the brake distance to be adjusted so as to converge into a constant range. The measurement of the brake distance is calculated from the vehicle speed and the brake time that have been measured since the time point of the brake operation.

As explained above, performing the certification again by employing the log during the travel in some cases and changing the control in some cases makes it possible to travel the vehicle having satisfied the conditions more assuredly.

(Fifth Exemplary Embodiment)

Figure 15:
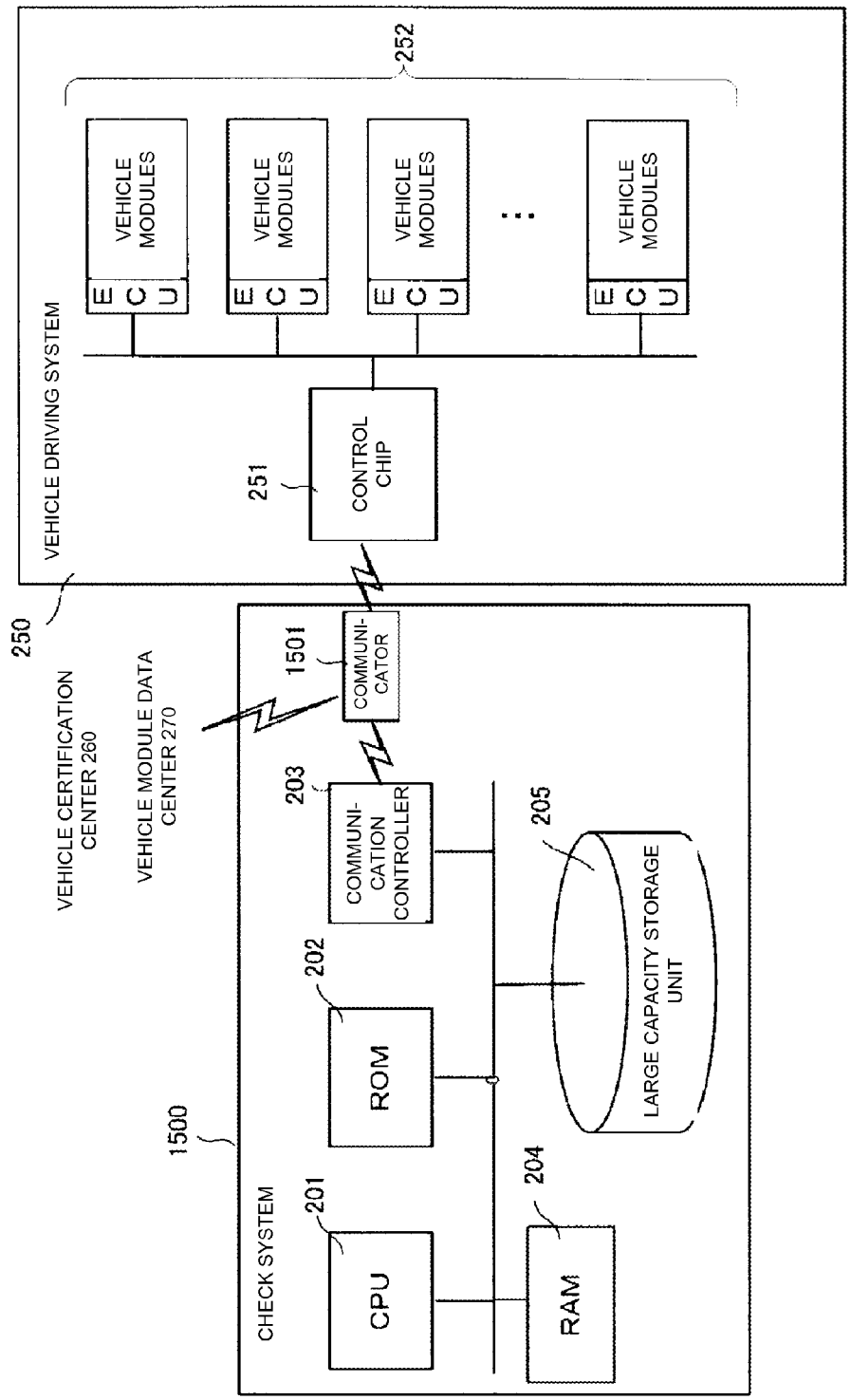
FIG. 15 is a view illustrating configurations of the check system and the vehicle driving system relating to a fifth exemplary embodiment of the present invention.

The fifth exemplary embodiment of the present invention will be explained by employing FIG. 15. The second exemplary embodiment shown in FIG. 2 assumes an aspect in which the communication controller 203 of the check system 200 directly communicates with the vehicle certification center 260 and the vehicle module data center 270; however in a check system 1500 relating to this exemplary embodiment, the communication controller 203 communicates with the outside via a communicator 1501 such as a mobile telephone. That is, the check system 1500 of this exemplary embodiment includes portable-type communicator such as the mobile telephone and a PDA, and the above communicator and the vehicle are connected via a wireless or a wire, thereby allowing communication between both to be realized.

The configuration above makes it possible to realize the check system 1500 by employing the portable-type communicator even though a function of communicating with the external device does not exist inside the vehicle.

(Other Exemplary Embodiment)

Above, the exemplary embodiments of the present invention were described in details, and the system or the device having separate characteristics to be included in respective exemplary embodiments combined in various manners therein are also included in a category of the present invention.

Further, the present invention may be applied to a system that is configured of a plurality of apparatuses, and may be applied to a single device. In addition, the present invention is applicable to the case in which the check program of the vehicle for realizing a function of the exemplary embodiments is directly or remotely supplied to the system and the device. Thus, the program installed in the computer in order to realize a function of the present invention or the medium having the above program stored therein, and a WWW server for downloading the above program are also included in a category of the present invention.

This application is based upon and claims the benefit of priority from Japanese patent application No. 2010-216252, filed on Sep. 27, 2010, the disclosure of which is incorporated herein in its entirety by reference.

What is claimed is:

1. An information processing system for checking a vehicle configured by combining a plurality of vehicle modules, comprising:
   a first judgment circuit configured to judge whether or not each vehicle module has been certified;
   a second judgment circuit configured to simulate an operation in a case of combining said plurality of the vehicle modules, and judges whether or not said combination of a plurality of the vehicle modules are certified, depending on whether or not a simulation result satisfies a predetermined reference; and
   a determination circuit configured to determine conditions necessary for said combination of a plurality of the vehicle modules to receive certification; and
   a presentation circuit configured to present an option of changing a control setting of any vehicle module within a range which satisfies said reference of the certification with regard to said combination of a plurality of the vehicle modules;
   wherein:
      said determination circuit comprises a second presentation circuit that presents an alternate vehicle module for receiving said certification:
         said second presentation circuit further comprises a vehicle module database having the vehicle modules, the alternate vehicle module being stored therein; and
         said second presentation circuit retrieves the alternate vehicle module satisfying said reference of the certification from the vehicle module database, and presents the retrieved alternate vehicle module, the alternate vehicle module being a replacement target.

2. The information processing system according to claim 1, wherein said determination circuit comprises a circuit that downloads a program necessary for receiving said certification.

3. The information processing system according to claim 1, further comprising a portable-type communicator, said information processing system communicating with said vehicle modules by employing a communication function of the above portable-type communicator.

4. A vehicle comprising the information processing system according to claim 1.

5. A method for checking a vehicle configured by combining a plurality of vehicle modules, comprising the steps of:
   judging whether or not each vehicle module has been certified;
   simulating an operation in a case of combining said plurality of the vehicle modules, and judging whether or not said combination of a plurality of the vehicle modules are certified, depending on whether or not a simulation result satisfies a predetermined reference;
   determining conditions necessary for said combination of a plurality of the vehicle modules to receive certification:
   presenting an option of changing a control setting of any vehicle module within a range which satisfies said predetermined reference with regard to said combination of a plurality of the vehicle modules;
   presenting an alternate vehicle module, from a vehicle module database, for receiving said certification; and
   retrieving an alternate vehicle module which satisfies said predetermined reference from the vehicle module database, and presenting the retrieved alternative vehicle module, the alternate vehicle module being a replacement target.

6. A non-transitory computer-readable medium storing a program for checking a vehicle configured by combining a plurality of vehicle modules, causing a computer to execute:
   a judgment step of judging whether or not each vehicle module has been certified;
   a judgment step of simulating an operation in a case of combining said plurality of the vehicle modules, and judging whether or not said combination of a plurality of the vehicle modules are certified, depending on whether or not a simulation result satisfies a predetermined reference;
   a determination step of determining conditions necessary for said combination of a plurality of the vehicle modules to receive certification;
   a presentation step presenting an option of changing a control setting of any vehicle module within a range which satisfies said predetermined reference with regard to said combination of a plurality of the vehicle modules;
   a presentation step presenting an alternate vehicle module, from a vehicle module database, for receiving said certification; and
   a retrieving step of retrieving an alternate vehicle module which satisfies said predetermined reference from the vehicle module database, and presenting the retrieved alternative vehicle module, the alternate vehicle module being a replacement target.

* * * * *